(12) United States Patent
Sapija et al.

(10) Patent No.: US 11,713,984 B2
(45) Date of Patent: Aug. 1, 2023

(54) POSITION DETERMINATION FOR VALVES

(71) Applicant: GOODRICH CORPORATION, Charlotte, NC (US)

(72) Inventors: Dariusz Sapija, Dolnslaskie (PL); Mikolaj Niewodniczański, Wysoka (PL); Jerzy Jakub Grzybowski, Wrocław (PL)

(73) Assignee: GOODRICH CORPORATION, Charlotte, NC (US)

( * ) Notice: Subject to any disclaimer, the term of this patent is extended or adjusted under 35 U.S.C. 154(b) by 650 days.

(21) Appl. No.: 16/713,085

(22) Filed: Dec. 13, 2019

(65) Prior Publication Data
US 2021/0055136 A1 Feb. 25, 2021

(30) Foreign Application Priority Data

Aug. 19, 2019 (EP) .................................. 19461570

(51) Int. Cl.
*G01D 5/347* (2006.01)
*F16K 37/00* (2006.01)
(52) U.S. Cl.
CPC ..... *G01D 5/34707* (2013.01); *F16K 37/0058* (2013.01); *G01D 5/3473* (2013.01); *G01D 5/34738* (2013.01); *G01D 5/34792* (2013.01)
(58) Field of Classification Search
CPC ........... G01D 5/34738; G01D 5/34707; G01D 5/342; G01D 5/40; G01D 5/3473; G01D 5/34792; F16K 37/0058
See application file for complete search history.

(56) References Cited

U.S. PATENT DOCUMENTS

| | | | |
|---|---|---|---|
| 2002/0044064 A1* | 4/2002 | Mogi | F16K 37/0083 340/686.1 |
| 2013/0116959 A1 | 5/2013 | York | |
| 2016/0153810 A1 | 6/2016 | Ootake | |
| 2019/0251301 A1 | 8/2019 | Hsu et al. | |

FOREIGN PATENT DOCUMENTS

JP 58123407 A 7/1983

OTHER PUBLICATIONS

European Office Action for EP Application No. 19461570.4, dated Nov. 9, 2021, pp. 1-5.
European Search Report for Application No. 19461570.4, dated Feb. 21, 2020, 13 pages.

* cited by examiner

*Primary Examiner* — Jennifer D Bennett
(74) *Attorney, Agent, or Firm* — Cantor Colburn LLP (57) ABSTRACT

A rotary encoder for a valve comprises a rotatable code plate and an optical detector module comprising one or more optical detectors. The code plate defines a set of voids arranged along a set of one or more concentric circular arcs about an axis of rotation. The voids define an angle-dependent pattern over the set of arcs, the pattern comprising a plurality of distinct sectoral elements (A-O, X). At least two of the sectoral elements, located in non-adjacent sectors of the code plate, are identical, but the pattern is non-repeating over a single full rotation of the code plate about the axis. Each optical detector is aligned with a respective concentric circular arc of the code plate. A controller processes time-varying output signals from the optical detectors to determine successive positions of the rotatable code plate.

12 Claims, 6 Drawing Sheets

POSITION DETERMINATION FOR VALVES

FOREIGN PRIORITY

This application claims priority to European Patent Application No. 19461570.4 filed Aug. 19, 2019, the entire contents of which is incorporated herein by reference.

BACKGROUND

This disclosure relates to rotatable code plates, rotary encoders and position sensors for determining the position of a valve, and to methods of installing the same.

It is known to use a position sensor containing micromechanical switches to determine the rotational position of a valve, such as a three-way ball valve. When the valve is a motorised valve, such a position sensor can be used to provide feedback on the position of the valve to a controller so that the controller can operate the motor appropriately to rotate the valve to a desired state.

However, such micro-mechanical position sensors can be bulky and unreliable. They are subject to mechanical wear over time, and can output spurious signals in the presence of strong vibrations or other external forces. Also, the tolerances of the switches lever can make it difficult or impossible to achieve high accuracy.

Optical absolute rotary encoders are known that use a photo detector array to determine a position of a shaft by reading an optical pattern from rotatable code plate. Different optical patterns correspond to different respective angular ranges. However, such optical encoders are typically complex and relatively large.

SUMMARY OF THE DISCLOSURE

From a first aspect, the disclosure provides a rotatable code plate for a rotary encoder, wherein the code plate is configured for rotation about an axis and defines a set of voids arranged along a set of one or more concentric circular arcs about the axis, wherein the voids define an angle-dependent pattern over the set of arcs, the pattern comprising a plurality of distinct sectoral elements, wherein at least two of the sectoral elements, located in non-adjacent sectors of the code plate, are identical, but wherein the pattern is non-repeating over a single full rotation of the code plate about the axis.

From a second aspect, the disclosure provides a rotary encoder for a valve, the rotary encoder comprising of a rotatable code plate exemplifying the first aspect; and an optical detector module comprising one or more optical detectors, wherein each optical detector is aligned with a respective arc of said set of one or more concentric circular arcs around the rotatable code plate and is configured to receive light passing through a void of the code plate when the code plate is in any of a first set of angular positions and to be blocked by the code plate from receiving light through the code plate when the code plate is in any of a second set of angular positions.

From a third aspect, the disclosure provides a position sensor for a valve, the position sensor comprising a rotary encoder and a controller, wherein the rotary encoder comprises: a rotatable code plate for coupling to a valve; and an optical detector module comprising one or more optical detectors, wherein each optical detector is aligned with a respective concentric circular arc around the rotatable code plate and is configured to receive light passing through a void in the code plate when the code plate is in any of a first set of angular positions and to be blocked by the code plate from receiving light through the code plate when the code plate is in any of a second set of angular positions, wherein the controller comprises: a memory; and control logic, wherein the control logic is configured, when in a first state, to: receive a first set of time-varying output signals from the optical detector module as the code plate rotates during a first time period; process the first set of time-varying output signals to determine, from the first set of time-varying output signals, a first position of the rotatable code plate; and store data representative of the first position of the rotatable code plate in the memory, and wherein the control logic is configured, when in a second state, to: receive a second set of time-varying output signals from the optical detector module as the code plate rotates during a second time period, after the first time period; and process i) the stored data representative of the first position of the rotatable code plate and ii) the second set of time-varying output signals, to determine, from the stored data and from the second set of time-varying output signals, a second position of the rotatable code plate.

The rotatable code plate in examples of this third aspect may be a rotatable code plate exemplifying the first aspect.

From a fourth aspect, the disclosure provides a valve comprising of a valve body; a moveable valve member; and a position sensor, comprising a rotary encoder, for determining the position of the moveable valve member within the valve body; wherein the rotary encoder is coupled to the moveable valve member and wherein the rotary encoder exemplifies the second aspect and/or wherein the position sensor exemplifies the third aspect.

From a fifth aspect, the disclosure provides a method of installing a rotatable code plate for a valve, wherein the rotary code plate exemplifies the first aspect, the method comprising: coupling the rotatable code plate to a moveable valve member of the valve.

From a sixth aspect, the disclosure provides a method of installing a rotary encoder for a valve, wherein the rotary encoder plate exemplifies the second aspect, the method comprising: coupling the rotatable code plate of the rotary encoder to a moveable valve member of the valve.

From a seventh aspect, the disclosure provides a method of installing a position sensor for a valve, wherein the position sensor exemplifies the third aspect, the method comprising: coupling the rotatable code plate of the position sensor to a moveable valve member of the valve.

Thus it will be seen that, in accordance with the disclosure, a position sensor may determine an initial absolute position of a valve, to which the rotatable code plate is coupled, by analysing time-varying signals arising from the rotation of the code plate past an optical detector module. When the angle-dependent pattern of the code plate is non-repeating over one full rotation of the code (i.e. repeats only every 360 degrees), this allows an absolute position of the code plate to be determined unambiguously by processing time-varying output signals arising from the angle-dependent pattern. It may then use knowledge of this initial position to efficiently determine one or more later positions of the valve from subsequent time-varying signals. As explained in more detail below, by processing a set of time-varying output signals, the position sensor can distinguish between different sectoral elements, which may correspond to different valve positions or states, without requiring the code plate and detector module to generate a different, unique static output signal for each sectoral element, as is the case with a conventional absolute rotary encoder. The position sensor may therefore be simpler and more compact—e.g., having a smaller or simpler code plate and/or containing fewer optical detectors than would otherwise be required. However, unlike a conventional incremental rotary encoder, code plates and position sensors exemplifying the present disclosure can be used to determine an absolute position of the code plate just from a first set of time-varying output signals without requiring any additional sensors or information about the position of the code plate.

The code plate may be substantially cylindrical. It may be planar. It may have a circular cross section (disregarding any voids), although this is not essential. It may define or comprise a set of voids arranged along a set of one or more concentric circular arcs. Each void may be a closed through-hole (i.e. a hole wholly surrounded by the code plate) or it may be an open void (i.e. only partly bounded by a substrate of the code plate). Some or all of the voids may be elongate through holes. The holes may be elongate around one or more circular arcs, centred on an axis of rotation of the code plate (e.g., concentric with an outer extent of the code plate when the code plate is circular). One or more of the arcs may contain a plurality of distinct voids—e.g., two, four, six or more voids. In some examples, the code plate has exactly two arcs of voids, each arc containing exactly seven voids. In some examples, voids from respective arcs may overlap along a first set of radii and may be non-overlapping along a second set of radii.

When coupled to a moveable valve member, voids in the rotatable code plate may define a plurality of distinct sectoral elements, wherein each sectoral element corresponds with a respective state of the valve.

The control logic may be configured to enter the first state when the control logic is powered on or reset. It may be configured to enter the second state after storing the data representative of the first position in the memory.

The first and/or second set of time-varying output signals may comprise one or more sequences of values. Each sequence of values may depend on the output of a respective optical detector of the optical detector module. Each value may be representative of whether or not the respective optical detector is receiving light passing through the plane of the code plate at a moment in time. At least one of the sequences may comprise at least two different values, each value corresponding to a different moment in time. The values may be analogue or binary signal levels. They may be continuous or sampled.

The optical detector module may comprise a plurality of optical detectors—e.g. two or three or more. The first and/or second set of output signals may then comprise a plurality of synchronised sequences of values. The code plate may be rotatable about an axis. The optical detectors may lie along a common radius from the axis; this may facilitate a particularly compact design. The sequences of values may then contain respective values corresponding to common respective moments in time.

The control logic may determine the first position from a predetermined set of positions. Each position in the set may correspond to a particular range of angles of the code plate relative to the optical detector module (e.g. corresponding to a particular sector of the code plate being adjacent the optical detector module). The positions may correspond to respective sectors, which need not necessarily be all of the same angular extent (e.g. one of the positions may correspond to all angles around an arc of as much as 180 degrees of more, while another of the positions may correspond to an angular range of just a few degrees). Different positions may thus provide different levels of angular resolution or precision. These predetermined positions may correspond to different respective states of a valve. Some positions may correspond to settled states of the valve, e.g. in which the valve is intended to remain steadily for a time when in use, while other positions may correspond to transitional states of the valve, e.g. in which the valve is not intended to be left statically but which it may move through when transitioning between settled states.

The control logic may determine the first position of the code plate by identifying a time-varying pattern in the first set time-varying output signals that is associated with the first position. The control logic may be configured to distinguish between a plurality of predetermined time-varying patterns, each time-varying pattern being associated with a different respective position of the code plate. It may compare one or more sequences (e.g. time series) of values in the output signals with data (e.g. pre-stored data comprising one or more sequences of values) representing a set of different possible positions for the code plate. It may be configured to identify a match between the output sequences and the stored data.

The comparison may be time-aware—i.e. it may take account of how long the output signals remain in a constant state before changing to a different state—or it may be time-unaware—i.e. considering only the different states of the output signals without regard to the duration of each state. Using timing information may allow for a quicker determination of the first position by requiring fewer changes of state (i.e. less rotation) before a position of the code plate can be unambiguously identified. Thus, in some examples, the control logic comprises a timer for timing the duration of respective states of the output signals in the first set of time-varying output signals. The control logic may use the timer to sample the output signals at regular sampling intervals so as to generate one or more sequences of regularly-spaced values (which may be binary values). The control logic may compare the first set of output signals against data that encodes the duration of respective possible states of the output signals—e.g. data that comprises one or more sequences of values corresponding to said sampling rate.

The valve or the position sensor may comprise an actuator, such as an electric motor, for rotating the code plate and/or the moveable valve member. The controller may comprise circuitry for controlling the actuator.

The actuator may be arranged to rotate the code plate at a constant rate. This can facilitate the use of such time-aware pattern matching.

The control logic may be configured, when in the first state, to detect when the first set of time-varying output signals has reached a sufficient length to enable the first position to be determined unambiguously. The control logic may be configured to determine whether a pattern in the output signals matches two or more candidate positions. It may be configured to continue receiving output signals into the first set until a pattern in the output signals matches only one candidate position. The control logic may be configured to slow or stop the rotation of the code plate—e.g. by signalling a valve actuator to brake or stop rotating—in response to the control logic determining the first position.

The first position may represent the position the code plate is in at the most-recent end of the first set of time-varying output signals. The stored data may be a value representative of one of a set of predetermined positions (e.g., sectors or angular ranges) for the code plate.

When in the second state, the control logic may be configured to maintain a value in a memory of the control logic (e.g., in a register or RAM) representative of a current position of the code plate. When first entering the second state, it may set this equal to the first position. Once it has determined the second position, it may store data representative of the second position in the memory—e.g. replacing the data representative of the first position.

The control logic may, in the second state, be configured to receive further sets of time-varying output signals from the optical detector module as the code plate rotates during successive time periods. It may process i) stored data representative of a last-stored position of the rotatable code plate and ii) a further set of time-varying output signals, to determine, from the stored data and from the further set of time-varying output signals, a current position of the rotatable code plate. It may store this current position in memory, to become the last-stored position for the next positioning cycle.

Using the second (or subsequent last-stored) position data, the control logic need not perform a time-aware comparison of the second set of time-varying output signals. In fact, in some examples, it need not perform any comparison of values in the output signals at all. Instead, it may be configured to detect when the output signal changes (i.e. from any value to any other value) and to advance the stored current position by one increment around a cycle of position values (e.g. stored in the control logic as a lookup table) in response to each change of state in the time-varying output signals. It may determine whether to increment around the cycle of values in a first direction or a second direction in dependence on whether the actuator is rotating clockwise or counterclockwise (anticlockwise). However, in other embodiments, it may be configured to detect when the output signal attains a particular predetermined value (e.g. a value that corresponds to a settled position of the valve). By not using a timer to obtain timing information from the second (or further) set of output signals, examples may be able to produce a lower amount of electro-magnetic interference (EMI) in the second state than in the first state.

The control logic may be configured to determine the position of the code plate in response to a command. This may be a command to rotate the valve member to a target state (which may be anywhere within a target sector or angular range). The control logic may be configured to output a signal for a valve actuator to cause the valve member to rotate. The control logic may output a signal to cause the valve actuator to stop rotating when the control logic determines that the code plate has reached a target position corresponding to the target state of the valve member. It may output a signal to cause the valve actuator to slow (e.g. brake) when the control logic determines that the code plate is within a predetermined range of the target position—e.g. in an adjacent sector of the code plate to a target sector corresponding to the target state.

The control logic may be configured, in the second state, to process data representative of a target position of the code plate and data representative of a current (or last-stored) position of the code plate to determine whether to instruct a valve actuator to rotate clockwise or counterclockwise (anticlockwise), such that the code plate will rotate through a maximum of 180 degrees to reach the target position.

In some embodiments, the position sensor is configured so that the rotary encoder outputs the same predetermined signal (e.g. a logic high from each optical detector) when the valve is in any of a plurality of settled states, and outputs one or more different signals whenever the valve is in a transitional state. In this way, the control logic may simply detect the predetermined signal in the output to identify a settled state. The control logic may maintain a current settled state, and, when in the second state, may use the current settled state and the direction of rotation to determine when a target settled state has been reached by detecting one or more periods of the predetermined signal in the encoder output. This can enable simpler control logic to be used, in the second state, when the valve does not require early braking (e.g. when using a slow-speed valve).

The optical detector module may comprise a light source. It may comprise one or more light sources on an opposite side of the plane of the code plate from the one or more optical detectors. It may comprise a respective light source for each optical detector. The light sources may be light-emitting diodes (LEDs) or laser diodes. They may be infrared. The optical detectors may be photo detectors, such as photodiodes (e.g. PIN photo detectors), photoresistors, or phototransistors.

In some examples, the optical detector module comprises exactly two optical detectors. The control logic may determine a binary state of each optical detector (e.g., by thresholding an analogue signal) at moments in time, such that the output signals have one or four possible states at any instant (i.e. [0, 0]; [0, 1]; [1, 0]; or [1, 1]). If the position were determined only from an instantaneous reading of the output signals, it would therefore only be possible to distinguish four possible positions of the code plate (and hence the valve). However, by processing a set of time-varying output signals, captured as the code plate rotates, it is possible for examples of the disclosure to distinguish between more than four different positions—e.g., eight, ten, sixteen or more positions.

To distinguish between sixteen valve states, for example, a conventional Gray-coding optical absolute rotary encoder would require at least four optical detectors (since 16=2⁴). However, examples of the present disclosure are able to distinguish between eight (or more) different valve positions using an optical detector module having only two optical detectors.

The memory of the controller may store software instructions for execution by a processor. It may comprise volatile memory (e.g. RAM) and/or non-volatile memory (e.g. flash) . The control logic may comprise dedicated hardwired logic or control circuitry—e.g. an ASIC or field-programmable gate array (FPGA). In some examples it may comprise a micro-controller (MCU) or other processor. The control logic may comprise memory storing software. The operations disclosed herein may be implemented in software or in hardware or a combination of both in the control logic.

The rotary encoder may comprise a housing containing the code plate. The housing may be opaque. It may block substantially all light outside the housing from reaching the code plate. The housing may be configured to receive the optical detector module—e.g. it may comprising an opening for receiving the optical detector module, for example as a friction fit with the housing.

The housing and/or code plate may comprise plastics material and/or metal. Each may be made wholly or substantially or majority (by mass) of plastics material, or of a metal (including pure metal or metal alloy). For example, a housing and code plate designed for use in standard conditions (e.g. around room temperature) may be made wholly from plastics, while a housing and code plate designed for use in harsh or extreme conditions (e.g. for aerospace or space) may be made of metal.

One or both of the housing and code plate may be fabricated using an additive manufacturing method (e.g. 3D printing). This can allow a very compact design. In some embodiments, the housing and code plate are manufactured by a single additive manufacturing process—e.g. as one entity. It may be impossible to disassemble the housing and code plate non-destructively.

In some examples, the code plate may have diameter in the range 1 to 4 cm. The housing may be less than 1 or 2 cm tall. The housing may have a maximum diameter of 4 or 5 cm.

The code plate may be integrated with, or configured to be coupled to, a moveable valve member, such as a valve shaft connected to a ball of a ball valve. The housing may comprise fastening means for fastening the housing to the body of a valve, such that the optical detector module is static relative to the valve body.

The valve may be a ball valve or another rotationally-actuated valve. It may be for controlling the flow of gas or liquid, such as oil, water or air. It may be a two-way, three-way or n-way valve.

Features of any example described herein may, wherever appropriate, be applied to any other example described herein. Where reference is made to different examples or sets of examples, it should be understood that these are not necessarily distinct but may overlap.

BRIEF DESCRIPTION OF THE DRAWINGS

Certain preferred examples of the disclosure will now be described, by way of example only, with reference to the accompanying drawings, in which.

DETAILED DESCRIPTION

Figure 1:
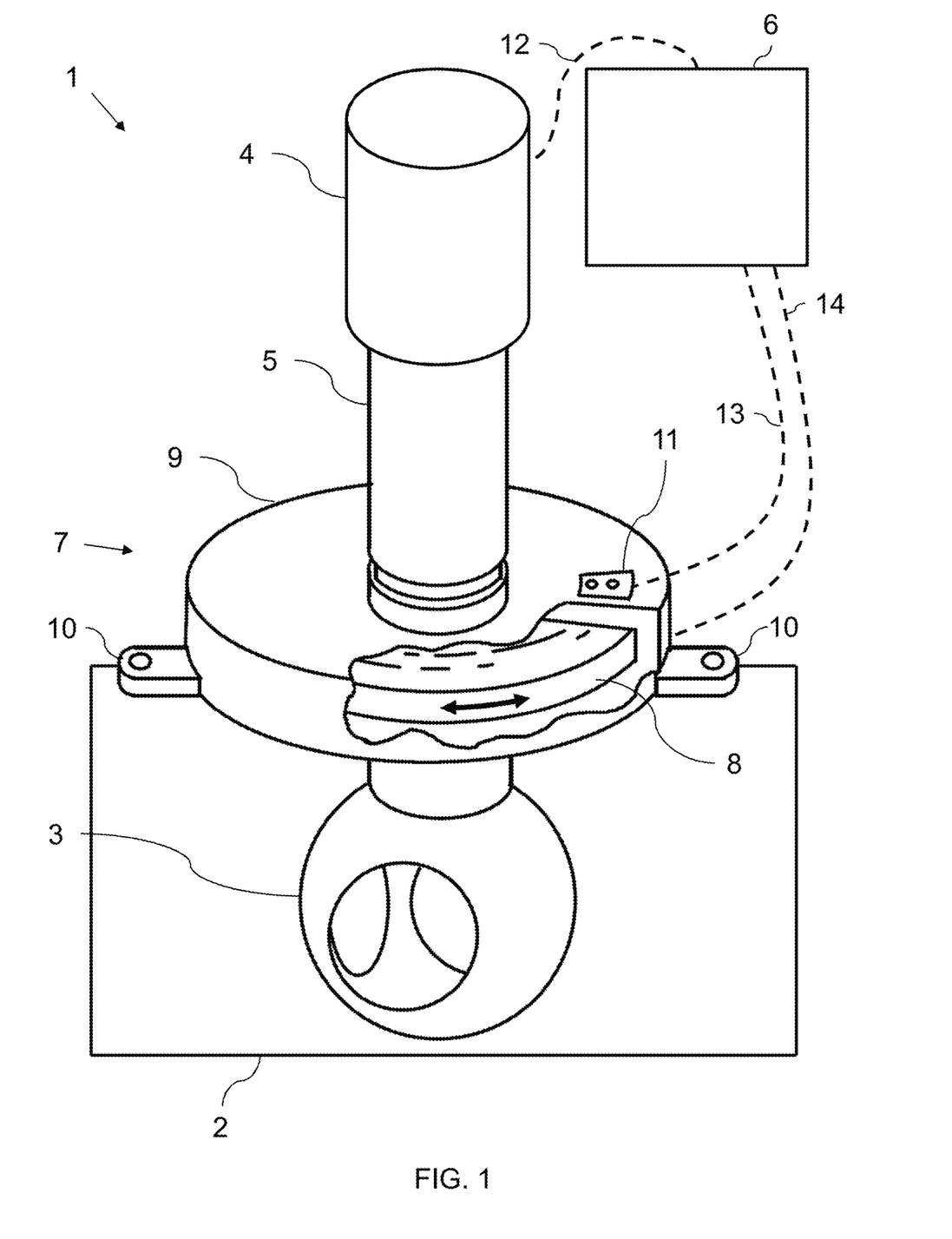
FIG. 1 is a mixed perspective and schematic drawing, including a partial cutaway, of a ball valve exemplifying the disclosure, the ball valve having a position sensor.

FIG. 1 shows an exemplary three-way ball valve 1 for controlling fluid flow between three pipes (not shown) to which the valve 1 may be coupled. The valve 1 could be designed for controlling liquid flow (e.g. water or oil) or for controlling gaseous flow (e.g. air). The design of the main valve body 2 and of the ball 3 are conventional. The main valve body 2 provides fluid channels and ports, which are omitted from FIG. 1 for simplicity. The valve 1 may be a T-port or an L-port valve.

In other examples, the valve 1 could be a two-way or n-way ball valve, or could be any other type of rotationally-actuated valve.

The ball 3 is coupled to a direct-current (DC) electric motor 4 by a rotary shaft 5. A controller 6 is connected to the electric motor 5 by a cable 12 for controlling the rotation of the ball 3 within the main valve body 2. The electric motor 4 is configured to rotate the shaft 5 at a constant rate when activated. The rotary shaft 5 is also coupled to a rotary encoder 7, which is situated between the ball 3 and the electric motor 4. More particularly, the shaft 5 is rigidly coupled to a rotatable code plate 8 which is free to rotate within a static sensor housing 9. In some embodiments, the code plate 8 is integrally formed with the shaft 5. The code plate 8 is a flat annular disc. The sensor housing 9 is secured to the main valve body 2 by two lugs 10 (or by any other appropriate mechanical assembly method). The rotary encoder 7 contains an optical detector module 11, fastened to the sensor housing 9. The controller 6 is connected to the optical detector module 11 by a pair of electrical connections 13, 14. A first lead 13 provides a power source to a pair of LEDs 20, 21 within the optical detector module 11, while the second lead 14 transports output signals from photo detectors 22, 23 within the optical detector module 11 to the controller 6. The rotary encoder 7 and at least some elements of the controller 6 together exemplify a position sensor as disclosed above.

The controller 6 contains electronic logic for starting and stopping the electric motor 4, and for controlling the sense of the rotation of the shaft 5 (i.e. clockwise or counterclockwise), based on control inputs (e.g. an instruction to set the valve 1 to connect two of three pipes coupled to the valve 1) and on feedback received from the optical detector module 11. The controller 6 contains logic for determining the rotational position of the code plate 8 (and hence the valve ball 3) based on signals it receives from the optical detector module 11. The controller 6 may contain a general purpose processor and a memory storing software instructions for execution by the processor. However, in other examples the controller 6 may use dedicated hardware control logic—e.g. an ASIC or FPGA implementing an appropriate finite state machine (FSM)—to control the electric motor 4.

Figure 2:
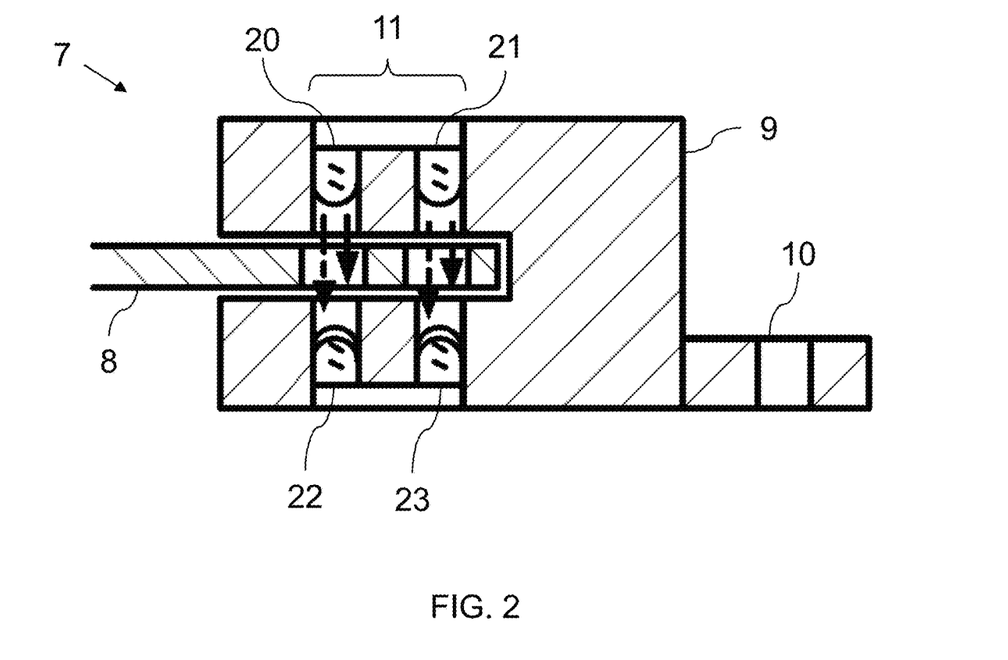
FIG. 2 is a vertical cross-section through part of the position sensor.

FIG. 2 shows the rotary encoder 7 in more detail. The optical detector module 11 contains a first infrared (IR) light-emitting diode (LED) 20 and a second IR LED 21 arranged above, and facing, the rotatable code plate 8, at different respective radial distances from the centre of the code plate 8. The LEDs 20, 21 are arranged to illuminate respective regions along a radius of the code plate 8. Facing the opposite face of the code plate 8 is a first IR photo detector 22 (which could be a PIN photo detector or a phototransistor), aligned with the first LED 20 so as to receive light from the LED 20 when a through hole (a void) in the code plate 8 is situated between the LED 20 and the photo detector 22. A second IR photo detector 23 (which could be a PIN photo detector or a phototransistor) is similarly aligned with the second LED 21 so as to receive light from the LED 21 when a respective through hole in the code plate 8 is situated between the second LED 21 and the second photo detector 23.

The LED-detector pairs 20-22, 21-23 are static, relative to the main valve body 2, while the code plate 8 can rotate between the LED and photo detector of each pair. Thus each photo detector 22, 23 receives light when a through hole in the code plate 8 is situated adjacent the photo detector 22, 23 and does not receive light from the respective LED 20, 21 when a solid region of the code plate 8 is situated between the LED 20, 21 and the photo detector 22, 23. These changes in light intensity can be detected by the controller 6 in the signals output by the photo detectors 22, 23.

In alternative examples, the two LEDs 20, 21 could be replaced with a single light source, arranged to direct light towards both photo detectors 22, 23.

Figure 3:
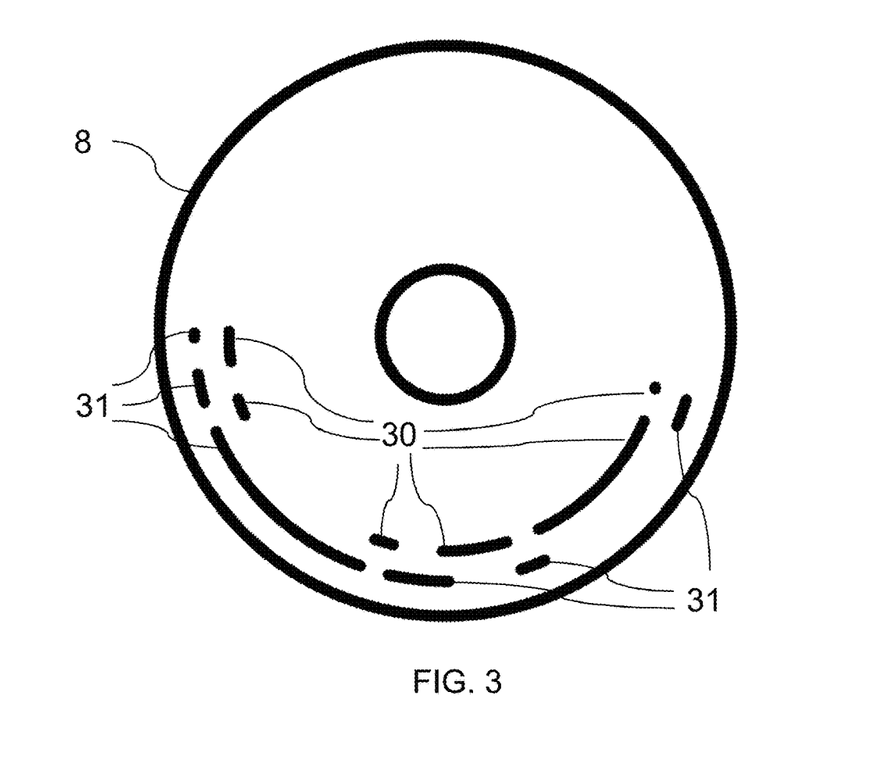
FIG. 3 is a plan view of a rotatable code plate of the position sensor.

FIG. 3 shows the locations of an exemplary set of through-holes (voids) in the code plate 8. The through-holes are elongate in the circumferential direction and of varying lengths. A first, inner set of the through-holes 30 are arranged about an inner circular arc, while a second, outer set 31 are arranged around about an outer circular arc. The inner set 30 are located at the same radial distance as the first LED 20 and the first photo detector 22, while the outer set 31 are located at the same radial distance as the second LED 21 and the second photo detector 23.

It will be appreciated that this particular pattern of holes is merely one of many possible examples. Various code plate designs can produce the same pattern of illumination of the photo detectors 22, 23 as a function of angle; furthermore, different designs of valve (e.g. T-port, L-port, etc.) will require different patterns of illumination. Although elongate holes may enable a strong code plate, it may in some examples be desirable to provide holes that have greater radial extent—e.g. to reduce the bill of materials, or to reduce the weight of the detector module 11. In some cases, the code plate 8 could have more void area than solid material within a circle defined by the position of the outer photo detector 23. The code plate 8 need not necessarily be circular in cross-section, but could be octagonal or any other appropriate shape.

The code plate 8 may be formed of any material—e.g., metal, ceramic, plastics, etc. Similarly, the sensor housing 9 may be formed of any suitable material. The sensor housing 9 may be opaque to IR light so that the photo detectors 22, 23 are not affected by ambient light. However, in some examples, the code plate 8 and the sensor housing 9 may conveniently both be fabricated of plastics materials, or both of a metal or metal alloy, using additive manufacturing techniques (e.g. using 3D printing in the case of plastics). They may be formed together (i.e. as a single complex unit) by a common additive manufacturing process. This can allow the rotary encoder module 7 to be very compact—e.g. with the code plate 8 being 1-2 cm in diameter, and the sensor housing 9 having a height of around 1 cm and a maximum diameter of approximately 4 cm. In some instances, a single additive process may be used to fabricate both the code plate 8 and the housing 9. In this way, only the electronic components of the optical detector module 11 need be added to complete the manufacture of the rotary encoder 7.

Figure 4:
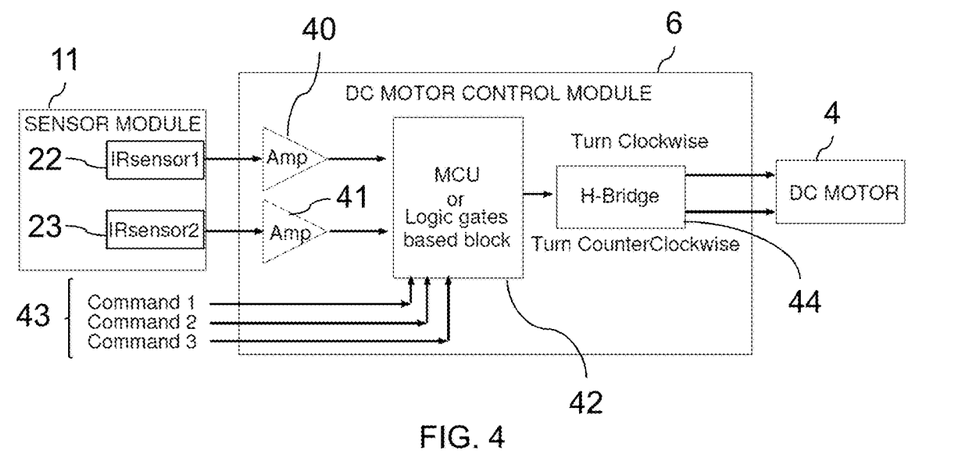
FIG. 4 is a schematic view of the main electronic components of the ball valve.

FIG. 4 schematically shows the main electronic components of the valve 1. The two IR photo detectors 22, 23 of the optical detector module 11 output electronic signals, proportional to the amount of IR light each is receiving, to respective amplifiers 40, 41 in the controller 6. A microcontroller (MCU) or dedicated logic block 42 (exemplifying the control logic disclosed above) in the controller 6 receives the amplified signals and applies a threshold to generate a binary on/off state for each photo detector 22, 23 depending on whether or not a through hole 30, 31 is positioned between the LED 20, 21 and the corresponding photo detector 22, 23.

The MCU or logic block 42 also provides a command interface 43 for receiving input commands from outside the valve 1 (e.g. from a computer, or from switches operated by a human user) for operating the valve 1. The motor 4 is fed by a DC power supply (not shown), via an H bridge 44. The controller 6 outputs control signals to set the switches of the H bridge 44 appropriately in order to cause the electric motor 4 to (i) rotate clockwise at a fixed speed, or (ii) rotate counterclockwise (anticlockwise) at a fixed speed, or (iii) stop (brake).

Figure 5:
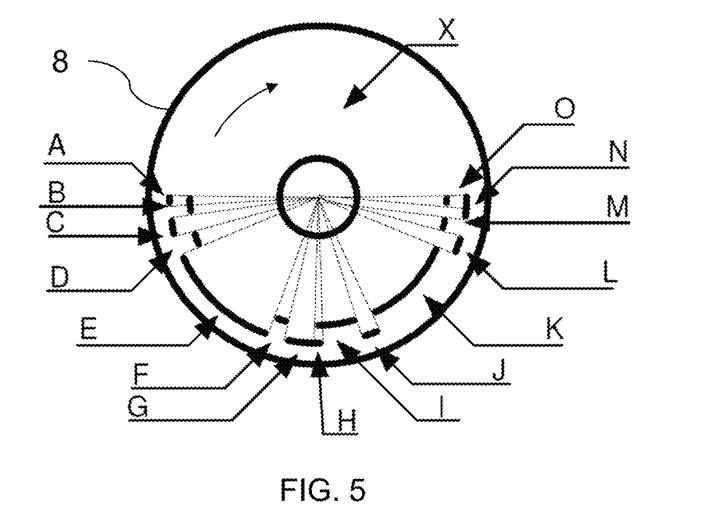
FIG. 5 is an annotated plan view of the rotatable code plate.
Figure 6:
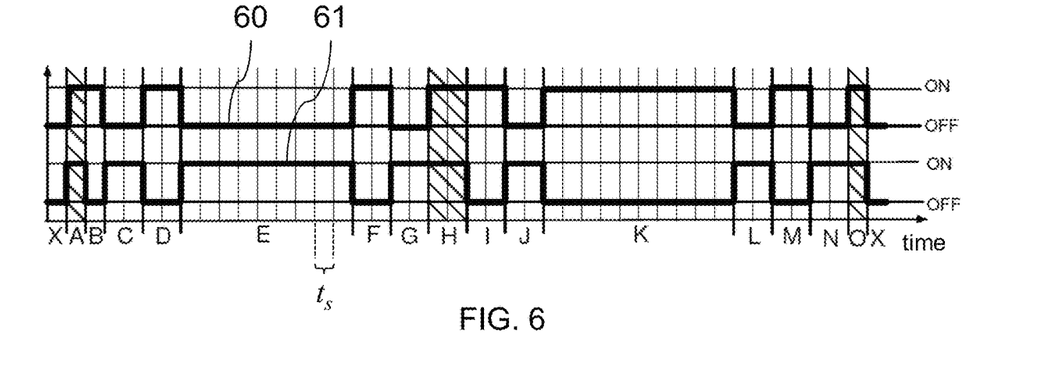
FIG. 6 is a graph of outputs of the position sensor over time as the rotatable code plate rotates clockwise.

FIGS. 5 & 6 show how the holes 30, 31 around the two arcuate tracks of the code plate 8 correspond to different positions of the valve ball 3 relative to the main valve housing 2. This can enable the controller 6 to set the valve 1 to a desired state, in response to a command received over the command interface 43, by signalling the motor 4 to stop when the valve ball 3 is in a desired position, as explained in more detail below.

The sixteen letter labels A-O and X in FIG. 5, labelling different sectors around the code plate 8, correspond to sixteen different states of the valve 1. Certain positions (sectors) correspond to operational states to which the valve 1 may be set and left in during use (e.g. a state in which a first pipe is connected to a second pipe, or a state in which all connections are closed), while the other positions correspond to transitional or intermediate states that the valve ball 3 passes through when changing between the operational states but which the valve 1 would not normally be left in statically.

In particular, sectors A, H, O (in which both photo detectors 22, 23 are high) represent operational states, at which positions the motor 4 may be stopped from rotating. Sectors B, C, D, F, G, I, J, L, M, N are transitional states, the detection of which can allow the controller 6 to control the speed of the motor 4 appropriately in a high-speed valve (e.g. reducing the rotational speed so that the valve stops with the detector module 11 exactly aligned with one of the sectors A, H, O). Sectors E, K are long way runs for rotating between valve states. Sector X (in which both photo detectors 22, 23 are low) is used to detect out-of-movement conditions.

The holes 30, 31 are arranged to suit the particular design of the ball 3 and valve housing 2. The transition between each labelled state corresponds to a change in the signals output by the IR photo detectors 22, 23, which can be detected by the controller 6. Exactly how the controller 6 uses these transitions to control the motor 4 may depend on the state of the controller 6 (e.g. whether it is in a start-up phase, or in a normal operating phase), and/or on an intended operating speed or characteristic of the valve, as explained in more detail.

The following table (TABLE 1) indicates the output states of the photo detectors 22, 23 for each valve state. However, this table does not indicate the angular extent of each state, which is not uniform; this variability can optionally be used by the controller 6 to speed up the adjusting of the valve 1.

TABLE 1

| Valve state | First photo detector 22 (x) | Second photo detector 23 (y) |
| --- | --- | --- |
| X | 0 | 0 |
| A | 1 | 1 |
| B | 1 | 0 |
| C | 0 | 1 |
| D | 1 | 0 |
| E | 0 | 1 |
| F | 1 | 0 |
| G | 0 | 1 |
| H | 1 | 1 |
| I | 1 | 0 |
| J | 0 | 1 |
| K | 1 | 0 |
| L | 0 | 1 |
| M | 1 | 0 |
| N | 0 | 1 |
| O | 1 | 1 |
| X | 0 | 0 |

As can be seen, only one sector—labelled X—has voids in both arcs, corresponding to a [0, 0] output from the optical detector module 11. This ensures that the pattern is non-repeating over one full rotation of the code plate about the axis, thereby ensuring the sectoral position of the code plate 8 can always be uniquely determined from a sufficiently-long portion of the pattern.

FIG. 6 additionally shows the angular (temporal) extent of each state, with the exception of state X, which, for this particular valve 1, is equal to approximately half a rotation. The upper line 60 plot the binary on/off state of the first photo detector 22 against time, as the code plate 8 is rotated clockwise (when viewed along an axis from the motor 4 to the ball 3) at a constant rate, while the lower line 61 shows the binary on/off state of the second photo detector 23. Because the motor 4 rotates the code plate 8 at a constant speed, the x-axis is also equivalent to the angular position of the ball 3 (relative to the optical detector module 11, and hence to the main valve housing 2).

The software executing on the MCU 52 (or alternatively, the logic in the logic block 52) operates the motor 4 in one of two distinct modes. In a first mode (or phase), the controller 6 uses a timer to determine the position of the code plate 8 relative to the optical detector module 11, based on the changing output of the optical detector module 11, without using any prior knowledge of the position of the code plate 8. In a second mode (or phase), the controller 6 determines the position of the code plate 8 based on a known starting position of the code plate 8, plus the changing output of the optical detector module 11. This second mode does not require use of a timer.

This two-mode approach allows for quick adjustment of the valve 1 to a desired position, while using a much simpler and cheaper code plate 8 and detector module 11 design than would be required by a traditional full absolute-position optical encoder of equivalent resolution.

The first mode is used when the controller 6 is first powered up, or after a reset. In these situations, the controller 6 does not know the state of the ball 3. Once the absolute position of the ball 3 has been determined, the controller 6 subsequently uses the second mode to adjust the ball 3 to desired positions, until the next reboot or reset. In this way, the use of the timer is kept to a minimum, thereby minimising the levels of electro-magnetic interference (EMI) emitted by the controller 6; this may be particularly important in certain applications such as aerospace.

Figure 7:
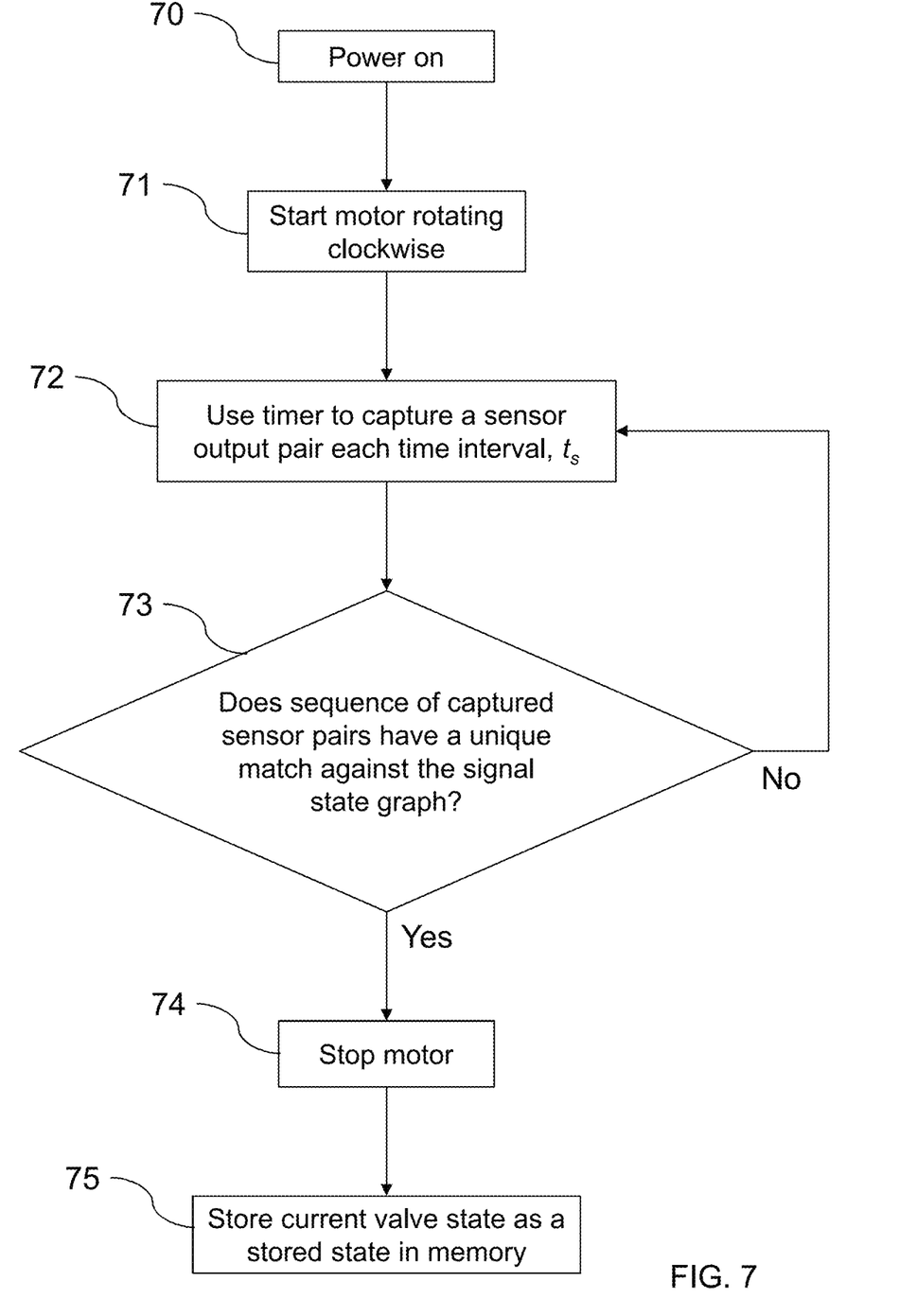
FIG. 7 is a flow chart of operations performed by the ball valve during a start-up phase.
Figure 8:
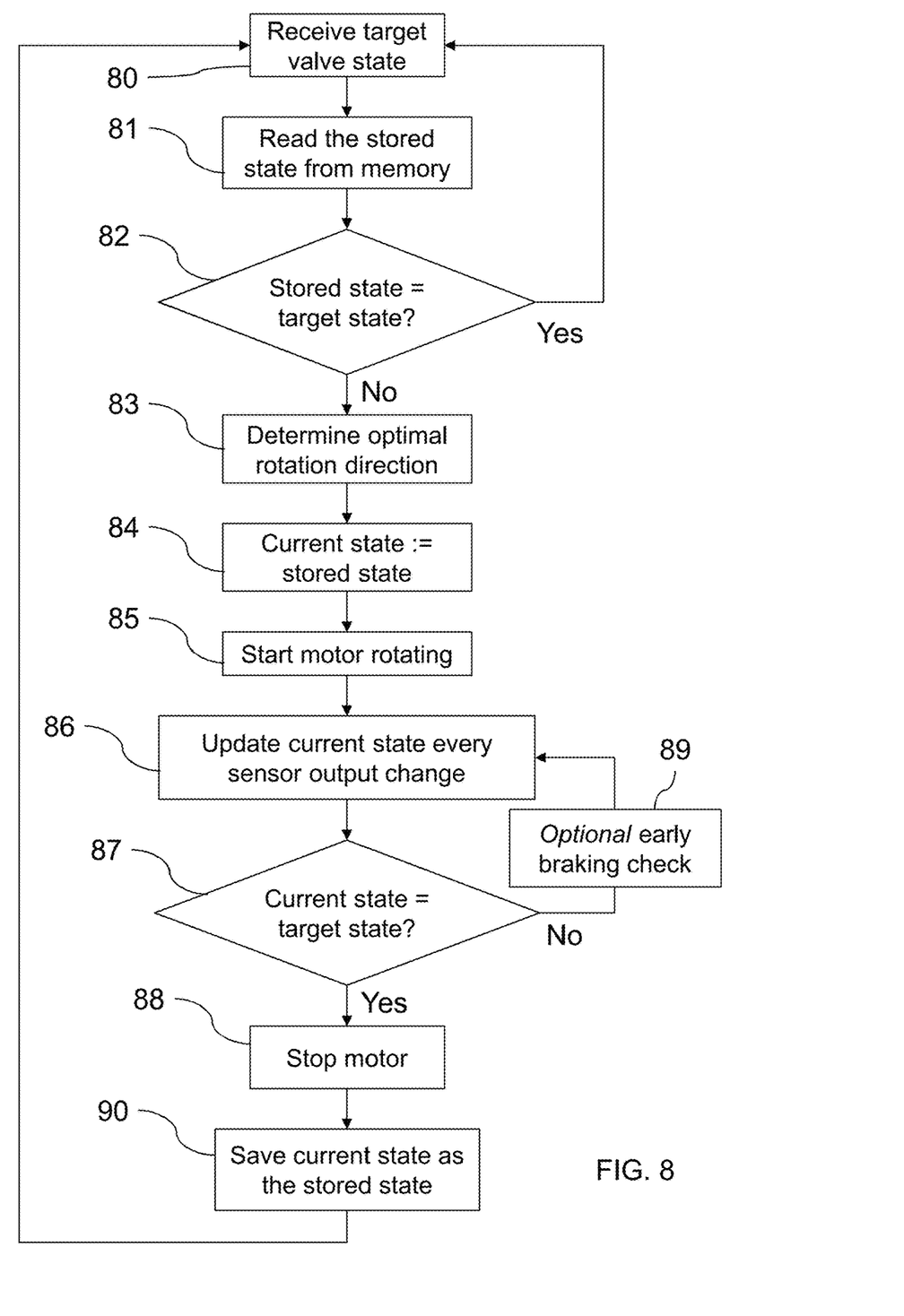
FIG. 8 is a flow chart of operations performed by the ball valve in an operating phase, suitable for high-speed control.
Figure 9:
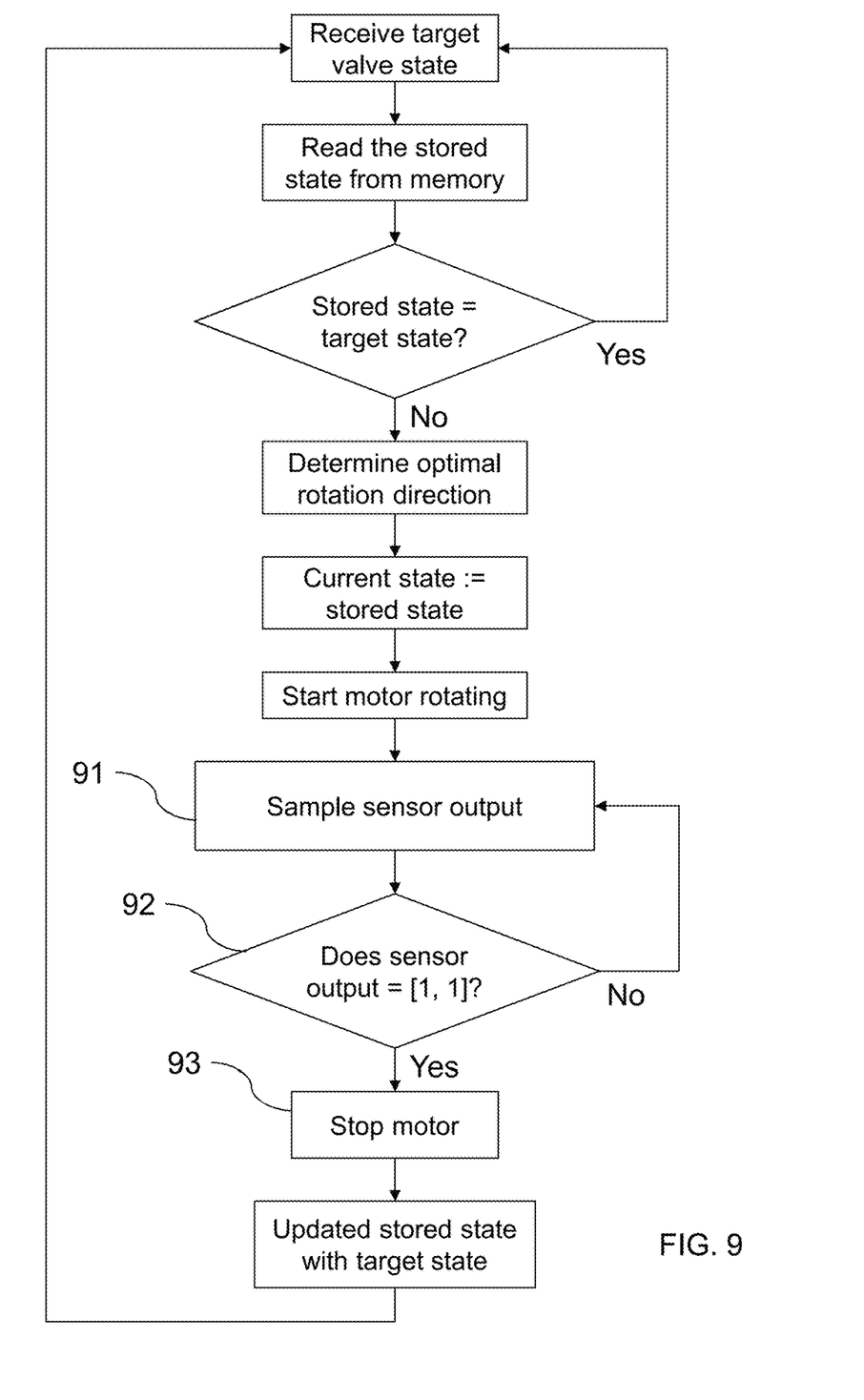
FIG. 9 is a flow chart of operations performed, in a variant embodiment, by the ball valve in an operating phase, suitable for low-speed control.

FIG. 7 shows operations performed by the controller 6 during the first mode, when the controller 6 is first powered on. FIGS. 8 and 9 show operations performed by the controller 6, in two different embodiments or configurations, during the second mode, after successful completion of the first mode operations.

In the first phase, the controller 6 is powered on 70. In order to determine the state of the valve 1, the controller 6 starts rotating the motor clockwise 71 at a constant rate. (In other embodiments, it could equally be configured to rotate counterclockwise instead.) As the code plate 8 rotates, the controller 6 uses a timer within the controller 6 to capture the state of the pair of photo detector 22, 23 output once every fixed time interval, ts. These time intervals ts are the same duration as the time intervals indicated by the regular x-axis marks in the signal state graph of FIG. 6.

The output pairs [xn, yn] are buffered in a volatile memory of the controller 6. Successive readings (i.e. n=0, 1, 2, . . . ) are still stored at regular intervals even during periods where there is no change in the output values; in this way, the duration of each steady state [x, y] is also recorded.

After each new sensor output pair is captured, the controller logic 42 determines whether the sequence of captured sensor pairs has a unique match to data representing the signal state graph, as shown partially in FIG. 6. This may be accomplished by stepping all through a tabular representation of the signal state graph, similar to the table shown above but having repeated entries wherever a particular state spans more than one time interval ts. The stepping may be done one row at a time (i.e. every interval ts) with the buffered values being compared against a sequence of values within the table at each step. If exactly one matching sequence is identified, the motor is stopped 74 and the valve state corresponding to the most recent output pair in the buffer is stored in a memory of the controller 6. If multiple matches are found, the process returns to capture an additional sensor output pair 72 and loops until a unique match is found. For the particular code plate 8 described in FIGS. 5 & 6, at most eight observations, at time intervals ts, are required to guarantee a unique match. If no match is found at any stage, an error is detected and the controller 6 may be reset or power cycled, so as to start against at the initial power-on step 70.

Once a stored state value has been written 75 to the memory of the MCU or logic block 42, the valve 1 is ready to receive command signals. The controller 6 enters the second mode, as shown in FIG. 8.

First, the controller 6 waits to receive 80 a command to set the valve 1 to a particular target state (e.g., by receiving data representing one of the letters A-O or X). It stores this in memory (e.g., in RAM or in a logic register).

The controller 6 then reads 81 the stored current state of the valve 1 from memory. It determines 82 whether the stored state already matches the target state. If so, no action is required and control returns back to the first step 80. If a change to the valve state is required, the controller 6 determines 83, from the stored and target states, whether it is quicker to rotate the shaft 5 clockwise or clockwise to reach the target state. It may use a lookup table to determine this, or could analyse data representing the signal state graph to determine which of the clockwise and counterclockwise (anticlockwise) angular distances is the smaller.

Next, the controller 6 sets a "current state" variable or register in memory to equal the stored state. In alternative examples, the controller 6 could update the stored state variable directly, instead of using a separate current state variable.

The controller 6 then starts rotating 85 the motor in the determined direction. Every time the binary output state of either of the photo detectors 22, 23 changes, the controller 6 updates the current state variable to equal the next state in the direction of rotation—e.g. if the current state is "C" and the rotation is clockwise, the current state will be updated to "D" when the photo detector 22, 23 output changes.

After each change to the current state variable or register, the controller 6 checks 87 whether the current state equals the target state. If not, it continues to monitor 86 for the next change to the sensor output as the shaft 5 continues to rotate. If they do match, the controller stops the motor 88 (if it has not already sent a brake command to motor 88 as described below) and updates 90 the stored state memory or register with a value representative of the current state. The control flow then returns to wait to receive 80 the next command.

In some embodiments, the controller 6 may optionally determine 89 from the signals when the plate 8 is approaching one of the target positions A, H, O. For example, if the plate 8 is being rotated clockwise from a starting state of A to a target state of H, the controller 6 may detect when the state changes from the way-run state E to the state F then state G as the valve approaches state H. The controller 6 may brake the motor 4 when state F or G is detected, so as to ensure the valve stops exactly in state H. This approach can be particularly useful when controlling the valve at high speed, or if the valve has a lot of inertia, which might otherwise cause it to overshoot the target sector H if no braking occurred until the detector signalled the state H.

In some embodiments, the controller 6 may optionally check that all the transitional signals have the expected values; it may perform an error action if they do not, e.g., by resetting the power cycling the controller 6.

Note that the controller 6 does not need to use the timer to perform these second mode operations, as it only monitors for changes in the output from the detector module 11, without regard to the timing of these changes. For this reason, in some examples (depending on the design and operation of the ball 3 and its housing 2), it may be beneficial for the elongate holes in the code plate 8 that correspond to the settled operational states to be relatively short, so that the valve ball 3 will stop in essentially the same position for each such operational state irrespective of whether it reaches this state after a clockwise rotation or after a counterclockwise (anticlockwise) rotation. For the transitional states, the same consideration may not apply.

Thus it will be seen that the valve 1 can be detected as being in any of sixteen different states (corresponding to sixteen unique angular ranges of the valve ball 3) using one two photo detectors 22, 23.

FIG. 9 shows an alternative, simpler implementation of the control logic in the operational mode, which may be suitable when the valve is being operated at low speed and/or has minimal inertia.

Most of the steps are the same as in FIG. 8, however, in this control flow, the controller 6 performs simpler state checking, which does not support early braking of the motor 4 nor error checking, but which may nevertheless be sufficient for some applications.

Instead of updating a "current state" variable every time the detector 11 signals a new state, the controller 6 here simple samples 91 the detector 11 output at regular intervals until it detects a [1, 1] signal—i.e. a high output from both photo detectors 22, 23, whereupon is stops 93 the motor 4. It ignores all other states.

Because the code plate 8 has, in these examples, been designed to give a [1, 1] output only on the steady-state operational positions, by maintaining the stored state (i.e. data representing states A, H, or O) in the memory of the controller 6, and by knowing the direction of rotation, the controller 6 can infer that the correct target state has been reached when [1, 1] is detected.

Although this approach can be implemented particularly efficiently on a valve that has only two or three operational states, a similar approach can also be applied to valves with more than three settled states, e.g. by counting when an appropriate number of transitions in and out of a [1, 1] state have passed.

It will be appreciated by those skilled in the art that the disclosure has been illustrated by describing one or more specific examples thereof, but is not limited to these examples; many variations and modifications are possible, within the scope of the accompanying claims. In particular, while the first mode is shown as using a timer to capture sensor outputs at regular intervals, ts, it will be appreciated that, with an appropriately designed code plate 8, some examples may be able to determine an absolute position of the code plate 8 based only a comparison of the sequence of changes to the output states from the photo detectors 22, 23 against the known signal state graph, irrespective of the duration of each output state. However, this will result in the initial phase taking longer, on average, as a greater range of rotation will be required on average before a unique match is found, so it will generally be more efficient to use a timer.

The invention claimed is:

1. A position sensor for a valve, the position sensor comprising:
    a rotary encoder; and
    a controller;
    wherein the rotary encoder comprises:
        a rotatable code plate for coupling to a valve; and
        an optical detector module comprising one or more optical detectors, wherein each optical detector is aligned with a respective concentric circular arc around the rotatable code plate and is configured to receive light passing through in the code plate when the code plate is in any of a first set of angular positions and to be blocked by the code plate from receiving light through the code plate when the code plate is in any of a second set of angular positions,
    wherein the controller comprises:
    a memory; and
    control logic, wherein the control logic is configured, when in a first state, to:
        receive a first set of time-varying output signals from the optical detector module as the code plate rotates during a first time period;
        process the first set of time-varying output signals to determine, from the first set of time-varying output signals, a first position of the rotatable code plate; and
        store data representative of the first position of the rotatable code plate in the memory, and
    wherein the control logic is configured, when in a second state, to:
        receive a second set of time-varying output signals from the optical detector module as the code plate rotates during a second time period, after the first time period; and
        process i) the stored data representative of the first position of the rotatable code plate and ii) the second set of time-varying output signals, to determine, from the stored data and from the second set of time-varying output signals, a second position of the rotatable code plate
    wherein the control logic is further configured to:
    determine the first position from a predetermined set of positions, each corresponding to a respective range of angles of the code plate relative to the optical detector module;
    determine the first position by comparing one or more time series of values from the first set of output signals with stored data representing a set of different possible positions for the code plate, to identify a match between the one or more time series of values and the stored data; and
    use a timer to perform a time-aware comparison of said one or more time series of values against the stored data.

2. A position sensor as claimed in claim 1, wherein the rotatable code plate is configured for rotation about an axis and defines a set of voids that the light passes through and that are arranged along a set of one or more concentric circular arcs about the axis, wherein the voids define an angle-dependent pattern over the set of arcs, the pattern comprising a plurality of distinct sectoral elements, wherein at least two of the sectoral elements, located in non-adjacent sectors of the code plate, are identical, wherein the pattern is non-repeating over a single full rotation of the code plate about the axis.

3. A position sensor as claimed in claim 2, wherein the control logic is configured to enter the first state when the control logic is powered on or reset, and is configured to enter the second state after storing the data representative of the first position in the memory.

4. A position sensor as claimed in claim 3, wherein each of the first and second sets of time-varying output signals comprises one or more sequences of values, each sequence of values depending on the output of a respective optical detector of the optical detector module, and each value being representative of whether or not the respective optical detector is receiving light passing through the plane of the code plate at a respective moment in time, wherein at least one of the sequences of values in each of the first and second sets of time-varying output signals comprises at least two different values, each value corresponding to a different moment in time.

5. A position sensor for a valve, the position sensor comprising:
   a rotary encoder; and
   a controller;
   wherein the rotary encoder comprises:
      a rotatable code plate for coupling to a valve; and
      an optical detector module comprising one or more optical detectors, wherein each optical detector is aligned with a respective concentric circular arc around the rotatable code plate and is configured to receive light passing through the code plate when the code plate is in any of a first set of angular positions and to be blocked by the code plate from receiving light through the code plate when the code plate is in any of a second set of angular positions,
   wherein the controller comprises:
   a memory; and
   control logic, wherein the control logic is configured, when in a first state, to:
      receive a first set of time-varying output signals from the optical detector module as the code plate rotates during a first time period;
      process the first set of time-varying output signals to determine, from the first set of time-varying output signals, a first position of the rotatable code plate; and
      store data representative of the first position of the rotatable code plate in the memory, and
   wherein the control logic is configured, when in a second state, to:
      receive a second set of time-varying output signals from the optical detector module as the code plate rotates during a second time period, after the first time period; and
      process i) the stored data representative of the first position of the rotatable code plate and ii) the second set of time-varying output signals, to determine, from the stored data and from the second set of time-varying output signals, a second position of the rotatable code plate;
   wherein the control logic is configured, when in the second state, to maintain a value in the memory representative of a current position of the code plate, and is configured to detect changes in the second set of output signals and to advance the stored current position by one increment around a cycle of position values in response to each change of state in the second set of time-varying output signals.

6. A position sensor as claimed in claim 5, wherein the rotatable code plate is configured for rotation about an axis and defines a set of voids that the light passes through and that are arranged along a set of one or more concentric circular arcs about the axis, wherein the voids define an angle-dependent pattern over the set of arcs, the pattern comprising a plurality of distinct sectoral elements, wherein at least two of the sectoral elements, located in non-adjacent sectors of the code plate, are identical, wherein the pattern is non-repeating over a single full rotation of the code plate about the axis.

7. A position sensor as claimed in claim 6, wherein the control logic is configured to enter the first state when the control logic is powered on or reset, and is configured to enter the second state after storing the data representative of the first position in the memory.

8. A position sensor as claimed in claim 7, wherein each of the first and second sets of time-varying output signals comprises one or more sequences of values, each sequence of values depending on the output of a respective optical detector of the optical detector module, and each value being representative of whether or not the respective optical detector is receiving light passing through the plane of the code plate at a respective moment in time, wherein at least one of the sequences of values in each of the first and second sets of time-varying output signals comprises at least two different values, each value corresponding to a different moment in time.

9. A position sensor for a valve, the position sensor comprising:
   a rotary encoder; and
   a controller;
   wherein the rotary encoder comprises:
      a rotatable code plate for coupling to a valve; and
      an optical detector module comprising one or more optical detectors, wherein each optical detector is aligned with a respective concentric circular arc around the rotatable code plate and is configured to receive light passing through the code plate when the code plate is in any of a first set of angular positions and to be blocked by the code plate from receiving light through the code plate when the code plate is in any of a second set of angular positions,
   wherein the controller comprises:
   a memory; and
   control logic, wherein the control logic is configured, when in a first state, to:
      receive a first set of time-varying output signals from the optical detector module as the code plate rotates during a first time period;
      process the first set of time-varying output signals to determine, from the first set of time-varying output signals, a first position of the rotatable code plate; and
      store data representative of the first position of the rotatable code plate in the memory, and
   wherein the control logic is configured, when in a second state, to:

receive a second set of time-varying output signals from the optical detector module as the code plate rotates during a second time period, after the first time period; and process i) the stored data representative of the first position of the rotatable code plate and ii) the second set of time-varying output signals, to determine, from the stored data and from the second set of time-varying output signals, a second position of the rotatable code plate;

wherein the control logic is configured, when in the second state, to received data representative of a target position for the code plate, and to process the received data and data representative of a current position of the code plate to determine whether to instruct a valve actuator to rotate clockwise or counterclockwise such that the code plate will rotate through a maximum of 180 degrees to reach the target position.

10. A position sensor as claimed in claim 9, wherein the rotatable code plate is configured for rotation about an axis and defines a set of voids that the light passes through and that are arranged along a set of one or more concentric circular arcs about the axis, wherein the voids define an angle-dependent pattern over the set of arcs, the pattern comprising a plurality of distinct sectoral elements, wherein at least two of the sectoral elements, located in non-adjacent sectors of the code plate, are identical, wherein the pattern is non-repeating over a single full rotation of the code plate about the axis.

11. A position sensor as claimed in claim 10, wherein the control logic is configured to enter the first state when the control logic is powered on or reset, and is configured to enter the second state after storing the data representative of the first position in the memory.

12. A position sensor as claimed in claim 11, wherein each of the first and second sets of time-varying output signals comprises one or more sequences of values, each sequence of values depending on the output of a respective optical detector of the optical detector module, and each value being representative of whether or not the respective optical detector is receiving light passing through the plane of the code plate at a respective moment in time, wherein at least one of the sequences of values in each of the first and second sets of time-varying output signals comprises at least two different values, each value corresponding to a different moment in time.

* * * * *